(12) United States Patent
Carpino, II

(10) Patent No.: US 12,296,964 B2
(45) Date of Patent: May 13, 2025

(54) ICE PROTECTION BACKUP TEMPERATURE CONTROL LOGIC

(71) Applicant: GOODRICH CORPORATION, Charlotte, NC (US)

(72) Inventor: Richard J. Carpino, II, Canton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 153 days.

(21) Appl. No.: 17/969,471

(22) Filed: Oct. 19, 2022

(65) Prior Publication Data
US 2024/0132219 A1    Apr. 25, 2024
US 2024/0228046 A9    Jul. 11, 2024

(51) Int. Cl.
B64D 15/22 (2006.01)
B64D 15/12 (2006.01)
B64D 33/02 (2006.01)

(52) U.S. Cl.
CPC ............. *B64D 15/22* (2013.01); *B64D 15/12* (2013.01); *B64D 33/02* (2013.01); *B64D 2033/0233* (2013.01)

(58) Field of Classification Search
CPC ........................ B64D 15/22; B64D 2033/0233
See application file for complete search history.

(56) References Cited

U.S. PATENT DOCUMENTS 10,822,999 B2 * 11/2020 Morris .................. H05B 6/109
2010/0243811 A1 * 9/2010 Stothers ................ B64D 15/14
702/182

2019/0168881 A1 * 6/2019 Maxwell .................. B60L 1/08
2020/0189754 A1 * 6/2020 Jones ....................... F01D 25/02
2020/0207479 A1 * 7/2020 Carpino, II ............ B64D 15/12
2021/0229818 A1 * 7/2021 Debbadi ................ B64D 15/20
2021/0231592 A1 * 7/2021 Zadell .................... G01N 25/18

(Continued)

FOREIGN PATENT DOCUMENTS

EP    680878      12/1999
EP    3549868     10/2019

(Continued)

OTHER PUBLICATIONS

European Patent Office, European Search Report dated Feb. 26, 2024 in Application No. 23203324.1.

*Primary Examiner* — Michael H Wang
(74) *Attorney, Agent, or Firm* — SNELL & WILMER L.L.P.

(57) ABSTRACT

A multi-zone anti-icing system for an aircraft part. The system includes at least two or more-part zones configured with the aircraft part and an electrothermal heater associated with at least one part zone of the aircraft part; at least one resistive temperature detector (RTD) associated with each part zone of the aircraft part configured to generate temperature data associated with each part zone. A controller coupled to the electrothermal heater and configured to implement an algorithm of a control logic for an anti-icing operation that uses feedback temperature data from at least one RTD at an associated part zone wherein the feedback temperature data is analyzed by the controller via the algorithm to assess reliability of the temperature data generated by the at least one RTD associated with each part zone.

18 Claims, 5 Drawing Sheets

| *ZONE | NOMINAL DUTY CYCLE IN OPERATION | DUTY CYCLE FOR MAX ALLOWABLE TEMP | ALLOWABLE DUTY CYCLE LIMIT (MUST ALWAYS SATISFY BOTH) | | WHAT THIS MEANS... | **THEN DO THIS... |
|---|---|---|---|---|---|---|
| 1 | 70% | 85% | ZONE 2 +35% | ZONE 3 +45% | IF ZONE 1 IS OPERATING ON A DUTY CYCLE THAT IS GREATER THAN 35% MORE THAN ZONE 2 OR 45% MORE THAN ZONE 3, THE ZONE 1 RTD IS CONSIDERED TO HAVE FAILED | RUN ZONE 1 DUTY CYCLE AT ZONE 2 +20% |
| 2 | 50% | 65% | ZONE 1 - 5% | ZONE 3 +25% | IF ZONE 2 IS OPERATING ON A DUTY CYCLE THAT IS GREATER THAN 5% LESS THAN ZONE 1 OR 25% GREATER THAN ZONE 3, THE ZONE 2 RTD IS CONSIDERED TO HAVE FAILED | RUN ZONE 2 DUTY CYCLE AT ZONE 3 +10% |
| 3 | 40% | 55% | ZONE 1 - 15% | ZONE 1 +5% | IF ZONE 3 IS OPERATING ON A DUTY CYCLE THAT IS GREATER THAN 15% LESS THAN ZONE 1 OR 5% GREATER THAN ZONE 2, THE ZONE 3 RTD IS CONSIDERED TO HAVE FAILED | RUN ZONE 3 DUTY CYCLE AT ZONE 2 -10% |
| *EXAMPLE IS THREE ZONE ENGINE INLET WITH ZONE 1 AS LEADING EDGE, ZONE 2 AS OUTER AFT SURFACE, ZONE 3 AS INNER AFT SURFACE. ASSUMPTION IS THAT MATERIAL TEMPERATURE LIMIT OCCURS AT DUTY CYCLE ~15% HIGHER THAN NORMAL OPERATING FOR ALL ZONES (IN REALITY THIS WILL VARY). | | | | | | **ALWAYS CHOOSE MOST REPRESENTATIVE ZONE. ZONES 2 AND 3 ARE AFT ZONES SO THEY WOULD REPLACE EACH OTHER. ZONE 2 IS CLOSET IN DUTY CYCLE TO ZONE 1, SO IT WOULD BE ZONE 1 REPLACEMENT. |

EXAMPLE CASE FOR A GIVEN OUTSIDE AIR TEMPERATURE AND AIRCRAFT SPEED    500

(56) References Cited

U.S. PATENT DOCUMENTS

2022/0411079 A1* 12/2022 Stothers ................ B64D 15/20
2023/0294833 A1*  9/2023 Clarke ............... G05D 23/1919
                                                    244/134 D
2023/0348074 A1* 11/2023 Bratianu-Badea ..... B64D 15/12

FOREIGN PATENT DOCUMENTS

| EP | 3854691 | 7/2021 |
| RU | 2557877 | 7/2015 |
| WO | 2022026604 | 2/2022 |

* cited by examiner

EXAMPLE CASE FOR A GIVEN OUTSIDE AIR TEMPERATURE AND AIRCRAFT SPEED

| *ZONE | NOMINAL DUTY CYCLE IN OPERATION | DUTY CYCLE FOR MAX ALLOWABLE TEMP | ALLOWABLE DUTY CYCLE LIMIT (MUST ALWAYS SATISFY BOTH) | | WHAT THIS MEANS... | **THEN DO THIS... |
|---|---|---|---|---|---|---|
| 1 | 70% | 85% | ZONE 2 +35% | ZONE 3 +45% | IF ZONE 1 IS OPERATING ON A DUTY CYCLE THAT IS GREATER THAN 35% MORE THAN ZONE 2 OR 45% MORE THAN ZONE 3, THE ZONE 1 RTD IS CONSIDERED TO HAVE FAILED | RUN ZONE 1 DUTY CYCLE AT ZONE 2 +20% |
| 2 | 50% | 65% | ZONE 1 - 5% | ZONE 3 +25% | IF ZONE 2 IS OPERATING ON A DUTY CYCLE THAT IS GREATER THAN 5% LESS THAN ZONE 1 OR 25% GREATER THAN ZONE 3, THE ZONE 2 RTD IS CONSIDERED TO HAVE FAILED | RUN ZONE 2 DUTY CYCLE AT ZONE 3 +10% |
| 3 | 40% | 55% | ZONE 1 - 15% | ZONE 1 +5% | IF ZONE 3 IS OPERATING ON A DUTY CYCLE THAT IS GREATER THAN 15% LESS THAN ZONE 2, THE ZONE 3 RTD IS CONSIDERED TO HAVE FAILED | RUN ZONE 3 DUTY CYCLE AT ZONE 2 -10% |

*EXAMPLE IS THREE ZONE ENGINE INLET WITH ZONE 1 AS LEADING EDGE, ZONE 2 AS OUTER AFT SURFACE, ZONE 3 AS INNER AFT SURFACE. ASSUMPTION IS THAT MATERIAL TEMPERATURE LIMIT OCCURS AT DUTY CYCLE ~15% HIGHER THAN NORMAL OPERATING FOR ALL ZONES (IN REALITY THIS WILL VARY).

**ALWAYS CHOOSE MOST REPRESENTATIVE ZONE. ZONES 2 AND 3 ARE AFT ZONES SO THEY WOULD REPLACE EACH OTHER. ZONE 2 IS CLOSET IN DUTY CYCLE TO ZONE 1, SO IT WOULD BE ZONE 1 REPLACEMENT.

FIG.5

ICE PROTECTION BACKUP TEMPERATURE CONTROL LOGIC

FIELD

The present disclosure relates to systems and methods for anti-icing systems for aircraft parts using Resistance Temperature Detectors (RTDs) embedded in parts.

BACKGROUND

Various aircraft parts (such as a nacelle, a wing, or the like) may be subjected to relatively cold temperatures (e.g., below freezing) and moisture. This combination may result in ice formation on the parts. Electrothermal anti-ice heaters are usually controlled based on closed loop temperature feedback with the temperature monitored using a Resistance Temperature Detector (RTD) embedded in the part. The control logic should be capable of maintaining an adequate surface temperature to prevent the collection of ice while also limiting internal structure temperatures below structural material temperature limits. RTDs present a failure mode where the detected temperature can indicate normal operating limits where the actual temperature is an overheat runaway condition. Therefore, a backup temperature control is configured into a part via a second RTD and control sensor circuit, or an in-line overtemperature thermostat.

SUMMARY

Disclosed herein is an anti-icing system for an aircraft part of an aircraft.

In various embodiments, a multi-zone anti-icing system for an aircraft part is provided. The system includes at least two or more-part zones configured to divide a surface area of the aircraft part; a heater associated with at least one part zone of the aircraft part; at least one resistive temperature detector (RTD) associated with each part zone of the at least two or more-part zones of the aircraft part configured to generate temperature data associated with each part zone; and a controller coupled to the heater and configured to implement an algorithm of a control logic for an anti-icing operation that uses feedback temperature data from at least one RTD at an associated part zone wherein the feedback temperature data is analyzed by the controller via the algorithm to assess reliability of the temperature data generated by the at least one RTD associated with each part zone to determine a set of shut-down conditions for the at least one RTD associated with each part zone.

In various embodiments, the feedback temperature data serves as a backup temperature control data that enables assessment of reliability of the temperature data from the at least one RTD associated with each part zone.

In various embodiments, the controller is further configured to control the heater and to establish a shutdown condition for the control of the heater based on at least a comparison of values of the backup temperature control data and the temperature data generated by the at least one RTD associated with each part zone.

In various embodiments, the controller is configured to control the heater using control logic via the algorithm which correlates the temperature data between the associated part zone and each part zone based on a temperature difference and a power duty cycle difference that establishes a shut-down condition for a respective RTD.

In various embodiments, the part zone is associated with at least one of directly or indirectly with at least one part zone of the two or more-part zones of the aircraft part.

In various embodiments, the control logic enables a backup temperature control configured for each aircraft part.

In various embodiments, a backup RTD or overtemperature thermostat by the controller is implemented by the algorithm to assess reliability of the temperature data from the at least one RTD in a respective part zone of the aircraft part.

In various embodiments, the controller is enabled by the control logic to control the heater to maintain a surface temperature to prevent collection of ice while limiting an internal structural of a temperature of the aircraft part below a temperature limit for a material used in the aircraft part.

In various embodiments, the backup temperature control data provided can be indicative to the controller of a normal operating limit by the temperature data that is generated by the at least one RTD when exceeding a limit determines an overheat condition to the controller.

In various embodiments, the aircraft part is configured with reductions in weight and cost by a single RTD for a particular aircraft part.

In various embodiments, a system for heating an aircraft part of an aircraft is provided. The system includes at least two or more-part zones configured for a surface area of the aircraft part; an electrothermal heater associated with at least one part zone of the aircraft part wherein the aircraft part is divided into a plurality of part zones; at least one resistive temperature detector (RTD) associated with the at least one-part zone of the aircraft part configured to generate temperature data associated with the at least one-part zone; and a controller coupled to the electrothermal heater and configured to implement a control algorithm for an anti-icing operation using feedback temperature data from at least one RTD at an associated part zone wherein the feedback temperature data is analyzed by the controller via the control algorithm to assess reliability of the temperature data generated by the at least one RTD associated with the at least one-part zone of the aircraft part.

In various embodiments, the feedback temperature data serves as backup temperature control data to assess reliability of the temperature data from the at least one RTD associated with the at least one-part zone.

In various embodiments, the controller is further configured to control the electrothermal heater and to establish a shut-down condition for use of the temperature data from the at least one RTD of a respective part zone of the aircraft part.

In various embodiments, the controller is configured to control the electrothermal heater by control logic which correlates one or more temperatures between the associated part zone and a respective part zone of the aircraft part by applying a temperature difference and a power duty cycle difference to establish a fail-safe shut-down condition.

In various embodiments, the control logic enables a backup temperature control configured for each aircraft part of the anti-icing system.

In various embodiments, a redundant RTD or overtemperature thermostat configured in the aircraft part is eliminated for backup temperature assessments in the anti-icing system.

In various embodiments, the control logic is capable of maintaining an adequate surface temperature that prevents collection of ice of aircraft parts while also limiting internal structure temperatures below material temperature limits of the aircraft part.

In various embodiments, the controller is further configured to use feedback temperature data from the at least one RTD of an associated part zone comprising a corresponding part zone on an opposite side of the aircraft.

In various embodiments, reductions in weight and cost for an inlet heater, aircraft wiring, and temperature control unit can result by use of a single RTD in a respective aircraft part.

In various embodiments, a method for configuring a controller to heat an aircraft part is provided. The controller performs the steps of receiving temperature data from at least two or more-part zones configured for covering a surface area of the aircraft part; controlling an electrothermal heater associated with at least one part zone of the aircraft part; receiving temperature data detected by at least one resistive temperature detector (RTD) associated with at least one part zone of an aircraft part wherein the temperature data is associated with the at least one-part zone; and using a control algorithm for controlling the electrothermal heater for an anti-icing operation using feedback temperature data from at least one RTD at an associated part zone wherein the feedback temperature data is analyzed by the control algorithm to assess reliability of the temperature data generated by the at least one RTD associated with the at least one-part zone for the anti-icing operation.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 5 is a table that illustrates an exemplary case of percentage values of control of the duty cycle for operation of the anti-icing system in each part zone and for determination of RTD failures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one part or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
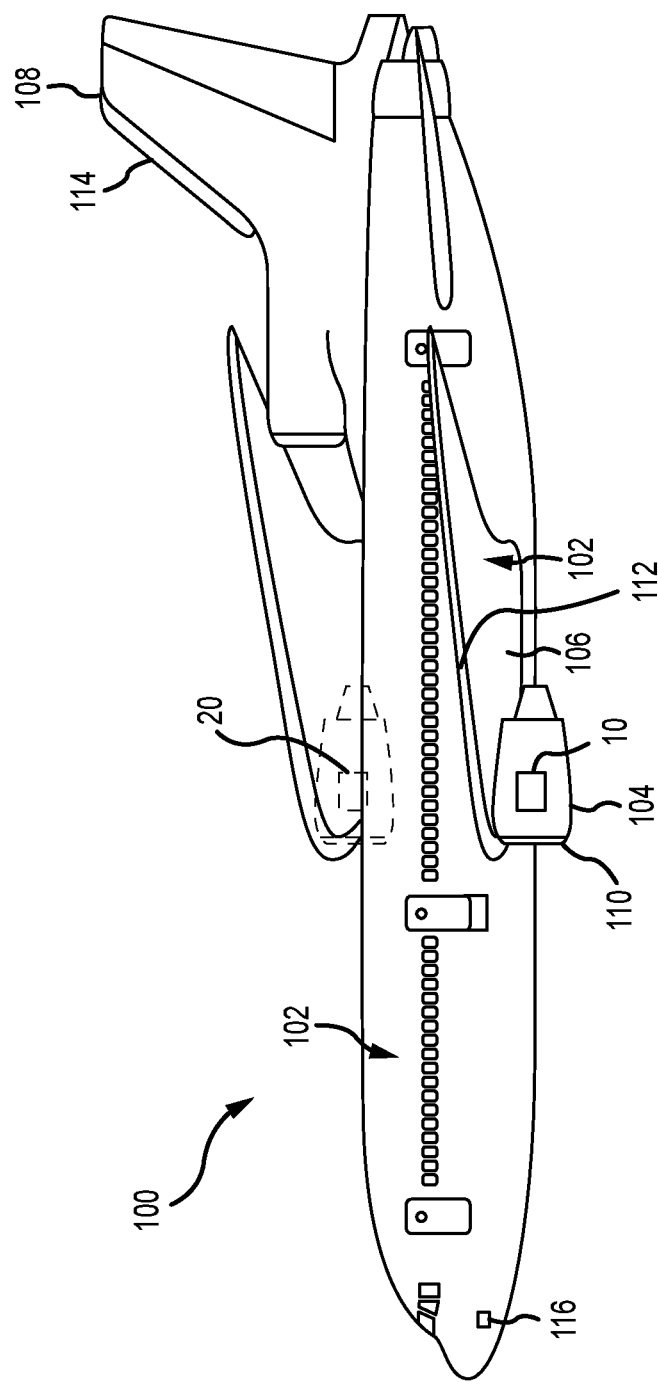
FIG. 1 illustrates an aircraft including various parts, in accordance with various embodiments.

Referring now to FIG. 1, an aircraft 100 is shown. The aircraft 100 may include multiple aircraft parts 102 which may be susceptible to ice formation thereon. For example, these aircraft parts 102 may include a nacelle 104, a wing 106, a tail wing 108, or the like. Heaters (e.g., heating mats, heating elements) may be located on areas of the aircraft parts 102 that are most susceptible to ice formation (e.g., leading edges of the aircraft parts 102).

In various embodiments, the parts 102 aircraft 100 can comprise a set of a right hand (RH) part 20 and left hand (LH) part. In this instance, data gleaned from either part, the RH part or the LH part can serve as a backup. In various embodiments, either part, the RH part or the LH part can serve as a source of backup data for an aircraft computer 116 (e.g., a controller associated with an RTD) to determine whether the RTD of the other part or particular part is operating normally or is malfunctioning. In various embodiments, as an example, by receiving backup data of a mirrored part on the opposite side of the aircraft 100, from the other part (the LH part or the RH part), the aircraft computer 116 can determined that a faulty temperature of the RTD has been detected as the part on the opposite side of the aircraft 100 will not generate data of normal operating limits. The aircraft computer 116 may then make determinations using various algorithms that the actual temperature of the aircraft part is likely to be that of an overheat condition or similar condition.

The aircraft computer 116 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the aircraft computer 116 may further include any non-transitory memory known in the art. The memory may store instructions usable by the logic device to perform operations as described herein. The aircraft computer 116 may be coupled to various parts of the aircraft 100 and may be capable of receiving, detecting, calculating, or determining various pieces of information regarding the aircraft 100 and its environment.

In various embodiments, the aircraft computer 116 may be configured and have stored therein programmed instructions to implement a control algorithm which uses associated part zone sensor (e.g., an RTD sensor) feedback data of an aircraft part that can serve as backup temperature control when receiving temperature data directly from multiple RTDs configured with the aircraft parts. In various embodiments, the aircraft computer 116 can determine or assess the reliability of temperature data received from the multiple sensors (i.e., RTDs) by using control logic that enables correlations between associated part zone temperatures of multiple part zones configured with aircraft parts. In various embodiments, the analysis may be performed at the aircraft computer 116 or at a local controller (302 of FIG. 3) configured to control the operation of the heaters. In various embodiments, the controller may also receive, directly or indirectly, sensor data of temperature associated with each part zone of an aircraft part.

In various embodiments, the control logic (i.e., control algorithm) applied by the aircraft computer 116 can be programmed with a pre-set or pre-configured temperature difference (i.e., temperature delta or threshold) and a power duty cycle difference that can be determined by empirical testing between a particular part zone configured in an aircraft part and an associated part zone to enable a check of validity of temperature data by the aircraft computer 116 (or the local controller of the heater) that is generated by a respective RTD sensor for a particular part zone. This checking process can enable configuring of certain thresholds in temperature differences between a sensed RTD part zone temperature and feedback data of the associated part zone that can establish one or more fail-safe shut-down conditions. The fail-safe shut-down conditions or criteria allows a sole RTD sensor configured for temperature sensing in a part zone of an aircraft part with sufficient checks for operability. Hence, by using the temperature difference criteria as a backup to assess the reliability of the RTD sensed temperature data, the need of a check performed by a backup RTD or overtemperature thermostat becomes redundant and only a primary RTD sensor is used in the anti-icing operation and integrated in a part zone of the aircraft part.

Figure 2:
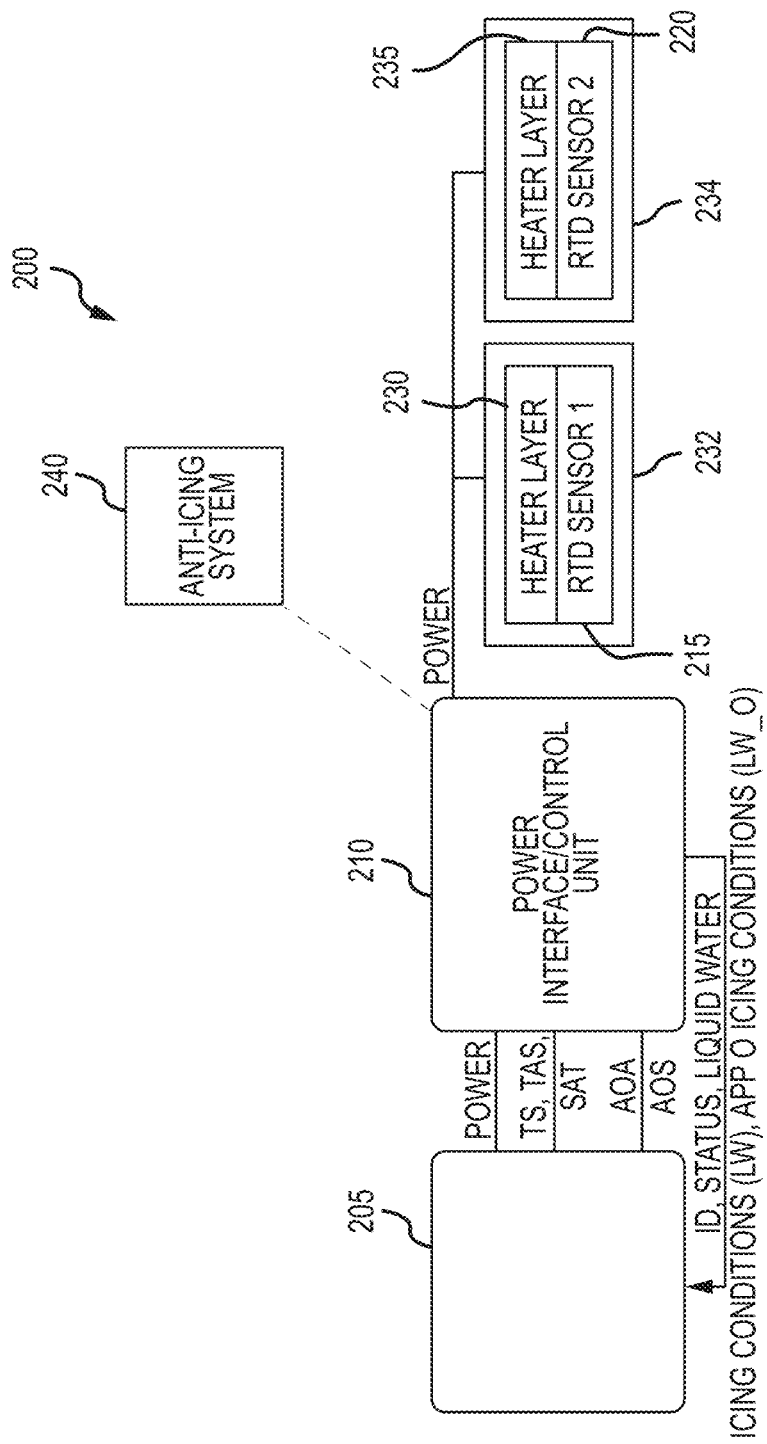
FIG. 2 is a block diagram illustrating a system for anti-icing system of an aircraft part, in accordance with various embodiments.

Referring now to FIG. 2, an aircraft 205 utilizes a power interface and control unit 210 that modulates the duty cycle to control operation of the anti-icing system. In various embodiments, the control unit 210 is configured to control anti-icing on a part zone-by-part zone basis where each part zone is independently controlled based in part on temperature data generated from respective RTD sensors (215, 220) that are located below a heater layer 230, 235. In various embodiments, the RTD sensors (215, 220) are approximately ½×½ inch (1.27 cm×1.27 cm) in size. In various embodiments, the aircraft engine inlet operates as a multi-zone anti-icer. In various embodiments, anti-icing operations are applied via the heating layer 230, 235 to the respective aircraft part zones (232, 234).

In various embodiments, in a configuration made up of a multiple zone that cover an aircraft part, the control unit 210 can be configured to receive temperature control data from a primary set of three RTDs and instead of another set or a secondary set comprising another three RTDs (for a pair of RTDs associated with each part zone) for six RTDs, using the analysis of the temperature differences to determine whether the primary set is operating correctly. By using feedback temperature data with a pre-configured difference to determine shutdown conditions, the number of RTDs is reduced to implement the anti-icing system and heater control operations.

Figure 3:
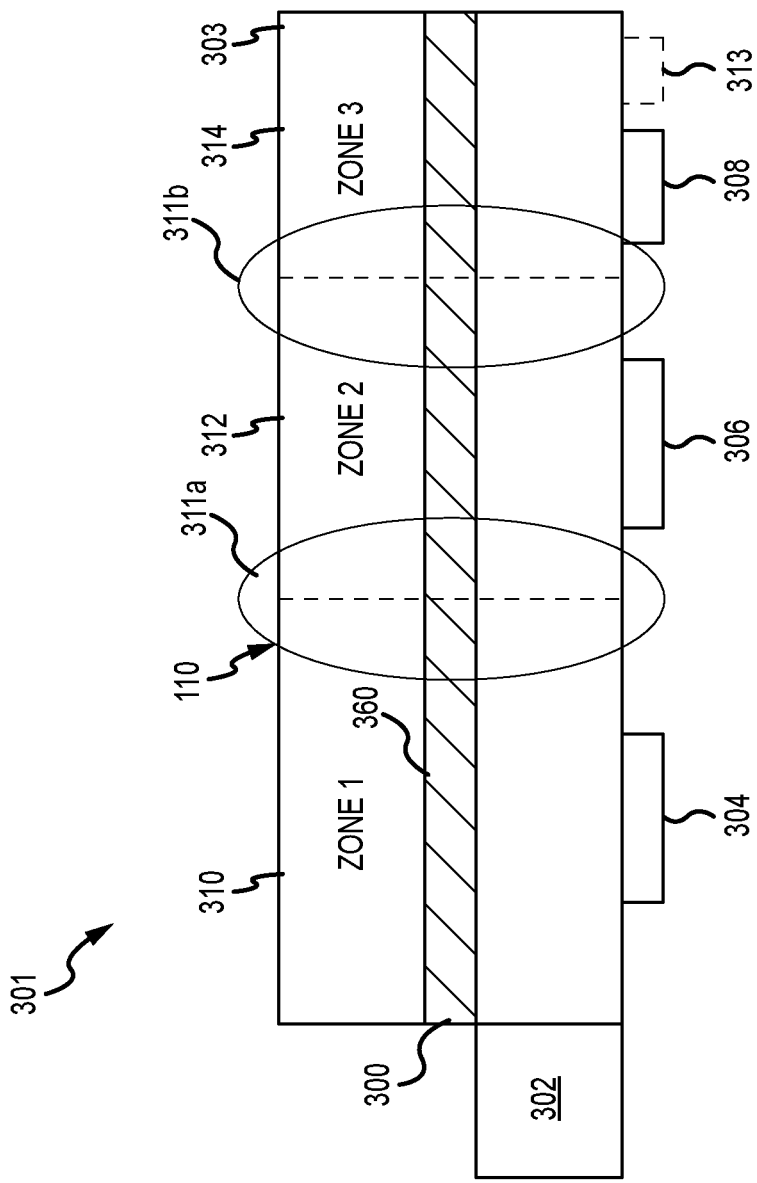
FIG. 3 is a block diagram illustrating multiple part zone for anti-icing system of an aircraft part, in accordance with various embodiments.

Referring now to FIG. 3, a system (i.e., an anti-icing system) 301 for controlling a heater 300 for heating a particular part zone of an aircraft part, such as an aircraft part 102 of FIG. 1, is shown. The system 301 includes the heater 300 with the heating element 360, and a controller 302. The controller 302 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 302 may further include any non-transitory memory known in the art. The memory may store instructions usable by the logic device to perform operations as described herein.

In various embodiments, the system 301 may further include multiple temperature sensors 304, 306, 308 (e.g., multiple RTD sensors) associated with the set of respective part zones 310, 312, 314. The sensors 304, 306, 308 may be associated with each other or in other configurations. In various embodiments, the sensors 304, 306, 308 send temperature data associated with the corresponding first, second-, and third-part zones 310, 312, 314 of the aircraft part 110 to the controller 302 that adjusts or controls the power (i.e., heating operation) of a heater 300 for the anti-icing operation. In various embodiments, the controller 302 may be associated with or integrated with the heater 300 or may be separate or set apart from the heater 300. The controller 302 may be configured to electrically communicate with the aircraft computer 116 of FIG. 1.

The heater 300 may include a heating element 360 integrated in a substrate in the aircraft part 110. The substrate may include any fiberglass reinforced epoxy or the like. The heating element 360 may convert electricity into heat (i.e., thermal energy) to increase a temperature of the aircraft part 110 to reduce ice developing on the aircraft part 110.

The temperature sensor 304, 306, 308 may include one or more resistance temperature detection (RTD) devices.

In various embodiments, other sensors or a separate device such as an LWC sensor 313 may be associated with the aircraft part 110 (and in the anti-icing system) and configured with a respective part zone (e.g., part zone 314) and can detect a liquid water content, e.g., water vapor, in the environment of the LWC sensor 313. In various embodiments, the LWC sensor 313 may detect a measurement of mass of liquid per unit volume of air, for example, in grams of liquid water per cubic meter of air or pounds of water per cubic foot.

The controller 302 may control the power provided to the heater 300 (i.e., the heating element 360) based on various factors. For example, the controller 302 may control the power provided the heating element 360 based on one or more factors of the aircraft speed (received from the aircraft computer 116), the data from the temperature sensor 304, or the data from the LWC sensor 313 (sent to the aircraft computer 116).

In various embodiments, the controller 302 may control the power provided to the heater 300 by adjusting the duty cycle of the provided power. The controller 302 may increase the power provided to the heating element 360 in response to the aircraft speed increasing and may decrease the power provided to the heating element 360 in response to the aircraft speed decreasing. Likewise, the controller 302 may increase the power provided to the heating element 360 in response to data of LWC increasing and may decrease the power provided to the heating element 360 in response to data of LWC decreasing.

In various embodiments, the measurements from anyone of the temperature sensors 304, 306, or 308 may be inaccurate or imprecise, thus resulting in undesirable control by the controller 302. In that regard, it is desirable for the controller 302 to determine that the temperature data from a particular temperature sensor 304, 306 or 308 is erroneous, by applying a control algorithm that correlates temperature data between the associated part zones (311a, 311b) of each of the multiple part zones 310, 312, 314 and a particular part zone by a pre-set temperature difference and a power duty cycle difference to establish a set of fail-safe shut-down conditions. If the pre-set temperature difference or the power duty cycle difference exceeds a pre-configured threshold, then the operation of the particular sensor is shut-down and the temperature data received by the particular sensor to the controller is deemed faulty, erroneous or inaccurate and not used in controlling power to the heater 300 and heating element 360.

In various embodiments, the controller 302 may provide power to the heating element 360 in response to water being present in the atmosphere, in response to the outside temperature being less than 32 degrees Fahrenheit (0 degrees Celsius), and the aircraft being off the ground (i.e., in flight).

The controller 302 may adjust the power provided to the heating element 360 by increasing or decreasing a duty cycle of the power provided to the heating element 360.

Figure 4:
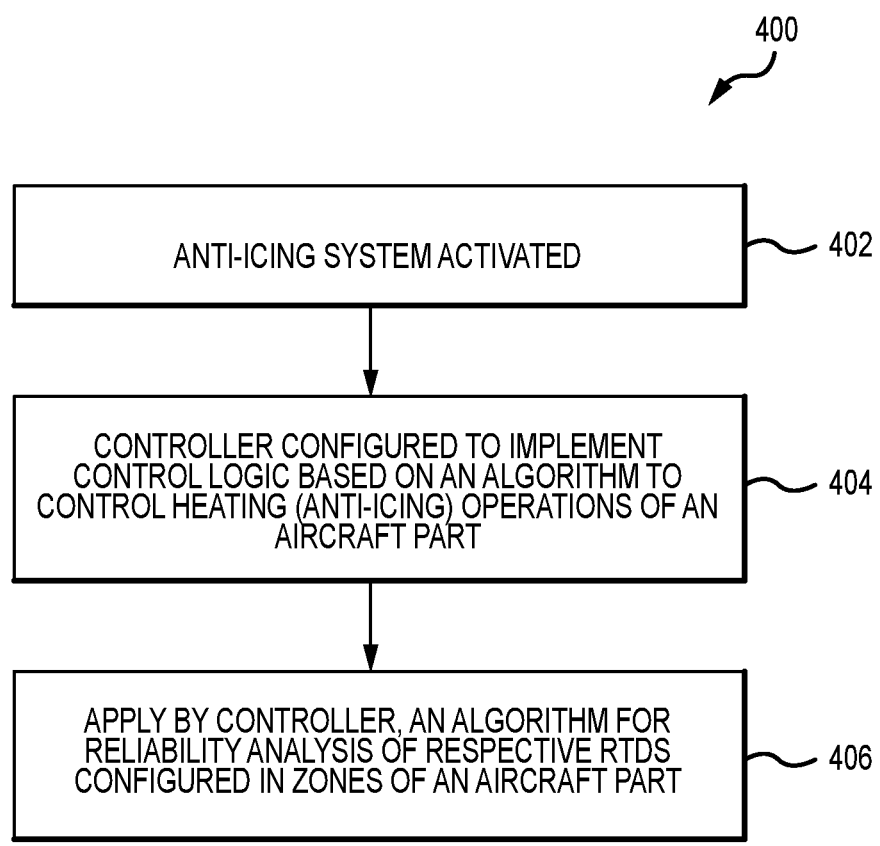
FIG. 4 is a flowchart illustrating a method of operating an anti-icing system of an aircraft part, in accordance with various embodiments.

Referring now to FIG. 4, a method 400 for assessing temperature data from an RTD configured in an aircraft part and for controlling heating of an aircraft part is shown. The method begins in block 402 where the anti-icing system is activated, if at a minimum, the outside air temperature is below a specified value. After that, at the minimum, the controller only requires data from the RTD feedback to operate the heater in various embodiments, the aircraft part is divided into multiple part zones and temperature data from at least two or more-part zones configured with the aircraft part is generated and received by the controller that controls heater operations for the anti-icing process. At block 404, the controller coupled to the electrothermal heater is configured to implement a control logic based on an algorithm for an anti-icing operation that uses feedback temperature data from at least one RTD at an associated part zone. The feedback temperature data is analyzed by the controller via the control algorithm to assess reliability of the temperature data generated by the at least one RTD associated with at least one part zone for the anti-icing operation.

At block 406, the controller may apply a control algorithm that correlates temperature data between the associated part zone and each part zone via by a pre-set temperature difference and a power duty cycle difference to establish a set of fail-safe shut-down conditions. In various embodiments, by using feedback temperature data with a pre-configured difference to determine one or more shutdown conditions for RTD operations based on assessments of erroneous or faulty temperature data generated by the respective RTD. In various embodiments, the number of RTDs required for each aircraft part is reduced (i.e., is halved) to implement the anti-icing system and heater control operations as a backup system for temperature reliability assessment for a respective RTD is not needed or is eliminated as the backup reliability assessment is performed by analysis of the temperature and duty cycle differences of a particular part zone and an associated part zone.

FIG. 5 illustrates an exemplary case of percentages of controller operations of the duty cycle indicative of RTD failure for a particular part zone during the anti-icing process. For example, for an outside air temperature and aircraft speed, percentage values of the nominal duty cycle in operation, the duty cycle for maximum allowable temperature and the allowable duty cycle limits that must be satisfied are shown in each part zone (i.e., the respective part zones 1-3 shown in FIG. 3) of control logic operations for the anti-icing operation are shown in table 500. In the example case, in part zone 1, if Part zone 1 is operating on a duty cycle that is greater than 35% more than Part zone 2 or 45% more than Part zone 3, then the RTD associated with Part zone 1 is considered to have failed. If the RTD with Part zone 1 is determined to have failed, then the controller is instructed to disregard the temperature data received and to operate the Part zone 1 duty cycle at the Part zone 2 duty cycle with an additional 20%. If Part zone 2 is operating on a duty cycle that is greater than 5% less than Part zone 1 or 25% greater than Part zone 3, the Part zone 2 RTD is considered to have failed. If so, then the controller is instructed to operate the Part zone 2 duty cycle at the Part zone 3 with an increase of about 10%. If Part zone 3 is operating on a duty cycle that is greater than 15% less than Part zone 1 or 5% greater than Part zone 2, the Part zone 3 RTD is considered to have failed. The controller is instructed to operate the Part zone 3 duty cycle at the Part zone 2 duty cycle minus about 10%. In various embodiments, the 1-3-part zones are configured for an engine inlet part divided into three-part zones with Part zone 1 as leading edge, Part zone 2 as outer aft surface, Part zone 3 as inner aft surface. The material temperature limit may occur at a duty cycle ~15% higher than normal operating for all part zones, although in actual operation this material temperature limit can vary. In implementation, a most or likely representative part zone is chosen as a replacement for modeling operations of a part zone associated with a RTD deemed to have failed. For example, Part zones 2 and 3 are aft part zones and are deemed likely representations of each other for replacement. Part zone 2 is closest in duty cycle to Part zone 1, so it would similarly be a better suitable replacement of Part zone 1.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, part, or method step in the present disclosure is intended to be dedicated to the public regardless of whether the element, part, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-zone anti-icing system for an aircraft part, the system comprising:
    at least three or more part zones configured to divide a surface area of the aircraft part, wherein an anti-icing of each part zone is controlled independently;
    a heater associated with at least one part zone of the aircraft part;
    a resistive temperature detector (RTD) independently associated with each part zone of the at least three or more part zones of the aircraft part configured to generate temperature data associated with each respective part zone; and
    a controller coupled to the heater and configured to implement an algorithm of a control logic for an anti-icing operation, the algorithm using a pre-set temperature difference threshold between at least two of the at least three or more part zones, a pre-set power duty cycle difference threshold between the at least two of the at least three or more part zones, and feedback temperature data from at least two RTDs each associated with a different part zone of the at least three or more part zones, and
    wherein the feedback temperature data is compared to the pre-set temperature difference and the pre-set power duty cycle difference by the controller via the algorithm to assess reliability of the temperature data generated by at least one RTD of the at least two RTDs to determine whether a set of shut-down conditions is met for the at least one RTD.

2. The system of claim 1, wherein the feedback temperature data serves as a backup temperature control data that enables the assessment of reliability of the temperature data from the at least one RTD associated with each part zone.

3. The system of claim 2, wherein the heater has a plurality of sections each corresponding to one of the at least three or more part zones, and wherein the controller is further configured to control the heater sections independently and to establish whether a shut-down condition is met for the control of the heater based on at least a comparison of values of the backup temperature control data and the temperature data generated by the at least one RTD associated with each part zone.

4. The system of claim 3, wherein the controller is configured to control the heater using control logic via the algorithm.

5. The system of claim 4, wherein the control logic enables a backup temperature control configured for each aircraft part.

6. The system of claim 5, wherein a backup RTD or overtemperature thermostat by the controller is implemented by the algorithm to enable the assessment of reliability of the temperature data from the at least one RTD in a respective part zone of the aircraft part.

7. The system of claim 6, wherein the controller is enabled by the control logic to control the heater to maintain a surface temperature to prevent collection of ice while limiting an internal structural of a temperature of the aircraft part below a temperature limit for a material used in the aircraft part.

8. The system of claim 7, wherein the backup temperature control data provided can be indicative to the controller of a normal operating limit by the temperature data that is generated by the at least one RTD when exceeding a limit determines whether an overheat condition to the controller is met.

9. The system of claim 1, wherein the aircraft part is configured with reductions in weight and cost by a single RTD for a particular aircraft part.

10. A system for heating an aircraft part of an aircraft, the system comprising:
    a first side aircraft part;
    a second side aircraft part, the second side aircraft part being a mirrored part of the first side aircraft part on an opposite side of the aircraft from the first side aircraft part;
    at least three or more part zones configured for a plurality of surface areas of each of the first side aircraft part and the second side aircraft part;
    an electrothermal heater associated with at least one part zone of each of the first side aircraft part and the second side aircraft part wherein each electrothermal heater of the first side aircraft part and the second side is controlled independently;
    at least one resistive temperature detector (RTD) associated with at least one part zone of each of the first side aircraft part and the second side aircraft part configured to generate temperature data associated with the at least one part zone of each of the first side aircraft part and the second aircraft part; and
    a controller coupled to the electrothermal heater and configured to implement a control algorithm for an anti-icing operation, the algorithm using a pre-set temperature difference threshold between a first part zone of the first side aircraft part and a corresponding part zone of the second side aircraft part, a pre-set power duty cycle difference threshold between the first part zone of the first side aircraft part and the corresponding part zone of the second side aircraft part, and feedback temperature data from at least one RTD of each of the first part zone and the corresponding part zone, and
    wherein the feedback temperature data is compared to the pre-set temperature difference and the pre-set power duty cycle difference by the controller via the control algorithm to assess reliability of the temperature data generated by the at least one RTD associated with at least one of the first part zone or the corresponding part zone.

11. The system of claim 10, wherein the feedback temperature data serves as backup temperature control data to enable the assessment of reliability of the temperature data from the at least one RTD associated with the at least one-part zone.

12. The system of claim 11, wherein the electrothermal heater has a plurality of sections each corresponding to one of the at least three or more part zones, and wherein the controller is further configured to control the electrothermal heater sections independently and to establish whether a shut-down condition is met for use of the temperature data from the at least one RTD of a respective part zone of the aircraft part.

13. The system of claim 12, wherein the controller is configured to control the electrothermal heater by control logic using the assessment of reliability of the temperature data.

14. The system of claim 13, wherein the control logic enables a backup temperature control configured for each of the first side aircraft part and the second side aircraft part.

15. The system of claim 13, wherein each RTD or overtemperature thermostat configured in the aircraft part is configured for backup temperature assessments in the anti-icing system.

16. The system of claim 15, wherein the control logic is capable of maintaining an adequate surface temperature that prevents collection of ice of aircraft parts while also limiting internal structure temperatures below material temperature limits of the aircraft part.

17. The system of claim 16, wherein reductions in weight and cost for an inlet heater, aircraft wiring, and temperature control unit can result by having a single RTD per independently controlled electrothermal heater.

18. A method for configuring a controller to heat an aircraft part, wherein the controller performs the steps of:

receiving temperature data from at least three or more part zones configured for covering a surface area of the aircraft part;

controlling an electrothermal heater having at least three or more sections, each section associated with at least one part zone of the aircraft part, and each section being independently controlled;

receiving temperature data detected by at least one resistive temperature detector (RTD) associated with each part zone of the aircraft part wherein the temperature data is associated with each respective part zone; and using a control algorithm for controlling the electrothermal heater sections for an anti-icing operation, the algorithm using a pre-set temperature difference threshold between at least two of the at least three or more part zones, a pre-set power duty cycle difference threshold between the at least two of the at least three or more part zones, and feedback temperature data from the at least one RTD at an associated part zone, and wherein the feedback temperature data is compared to the pre-set temperature difference and the pre-set power duty cycle difference by the control algorithm to assess reliability of the temperature data generated by the at least one RTD associated with the at least one-part zone for the anti-icing operation.

\* \* \* \* \*